US009948120B2

(12) United States Patent
Chan et al.

(10) Patent No.: US 9,948,120 B2
(45) Date of Patent: Apr. 17, 2018

(54) PORTABLE POWER SOURCE DEVICE

(71) Applicant: Fashionology Limited, Hong Kong (HK)

(72) Inventors: Li Chan, Hong Kong (HK); Lai Shun Nelson Chow, Hong Kong (HK)

(73) Assignee: Fashionology Limited, Hong Kong (HK)

( * ) Notice: Subject to any disclaimer, the term of this patent is extended or adjusted under 35 U.S.C. 154(b) by 57 days.

(21) Appl. No.: 14/882,463

(22) Filed: Oct. 14, 2015

(65) Prior Publication Data

US 2016/0105050 A1 Apr. 14, 2016

Related U.S. Application Data

(60) Provisional application No. 62/063,415, filed on Oct. 14, 2014.

(51) Int. Cl.
*H02J 7/00* (2006.01)
*G06F 1/16* (2006.01)
*H04B 1/38* (2015.01)
*H04M 1/04* (2006.01)
*A45C 11/00* (2006.01)
(Continued)

(52) U.S. Cl.
CPC ............ *H02J 7/0044* (2013.01); *A45C 11/00* (2013.01); *A45C 15/00* (2013.01); *G06F 1/1632* (2013.01); *G06F 1/26* (2013.01); *H01M 2/0285* (2013.01); *H02J 7/0052* (2013.01); *H04B 1/38* (2013.01); *H04M 1/04* (2013.01); *A45C 2005/037* (2013.01); *A45C 2011/002* (2013.01); *A45C 2013/025* (2013.01); *E05Y 2201/10* (2013.01); *H02J 2007/0062* (2013.01)

(58) Field of Classification Search
CPC ..................................... H02J 7/0044
USPC ......................................... 320/114
See application file for complete search history.

(56) References Cited

U.S. PATENT DOCUMENTS

2011/0036747 A1\* 2/2011 Petrick .................. G06F 1/1628
206/701
2011/0221320 A1 9/2011 Petrick et al.
(Continued)

FOREIGN PATENT DOCUMENTS

CN 202772640 U 3/2013
CN 202872400 U 4/2013
(Continued)

OTHER PUBLICATIONS

Search Report of counterpart Hong Kong Short-term Patent Application No. 15110049.3 dated Nov. 5, 2015.
(Continued)

*Primary Examiner* — Edward Tso
*Assistant Examiner* — Ahmed Omar

(57) ABSTRACT

A portable power source device includes a case having upper and lower shells hingedly connected by a living hinge. The upper and lower shells are formed with ventilation holes for heat ventilation. A power source assembly is provided on an inner surface of one of the shells. The power source assembly may include a battery, a control circuit board, at least one USB interface and a power-indicating unit. A support frame is provided on the inner surface adjacent to the power source assembly for supporting thereon an electronic device such as a mobile phone. The upper and lower shells are fastened together by a fastener.

14 Claims, 23 Drawing Sheets

(51) Int. Cl.
A45C 15/00 (2006.01)
G06F 1/26 (2006.01)
H01M 2/02 (2006.01)
A45C 5/03 (2006.01)
A45C 13/02 (2006.01)

(56) References Cited

U.S. PATENT DOCUMENTS

2012/0279516 A1* 11/2012 Bouix ................ A45D 33/008
132/301
2014/0002004 A1* 1/2014 Farris-Gilbert ....... H02J 7/0027
320/103
2014/0097793 A1* 4/2014 Wurtz ................ H02J 7/0042
320/108

FOREIGN PATENT DOCUMENTS

CN 103378615 A 10/2013
CN 203840025 U 9/2014

OTHER PUBLICATIONS

1st Office Action of counterpart Chinese Patent Application No. 201510662627.8 dated Oct. 10, 2017.

* cited by examiner

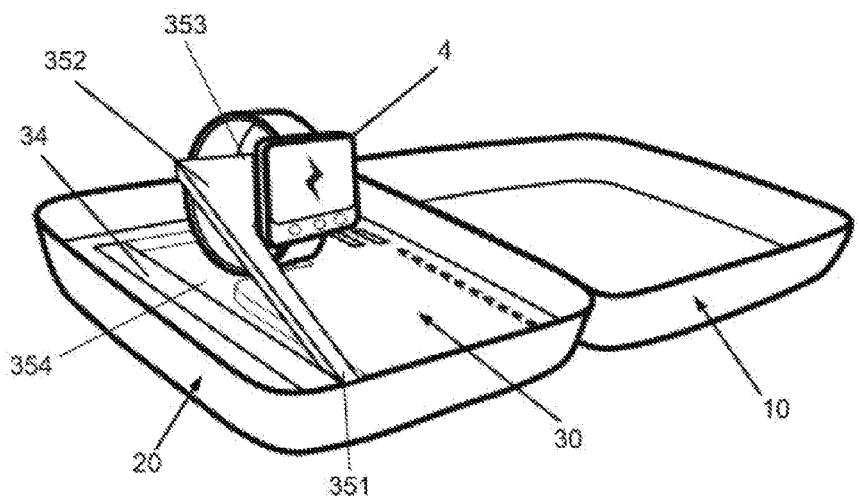
Fig. 2c
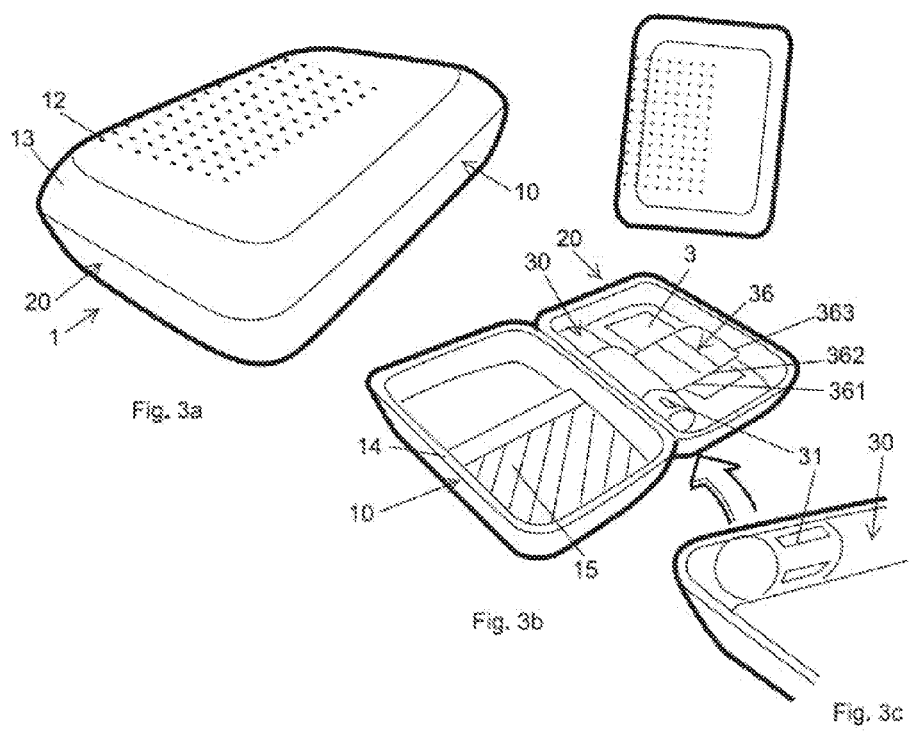
Fig. 3a
Fig. 3b
Fig. 3c

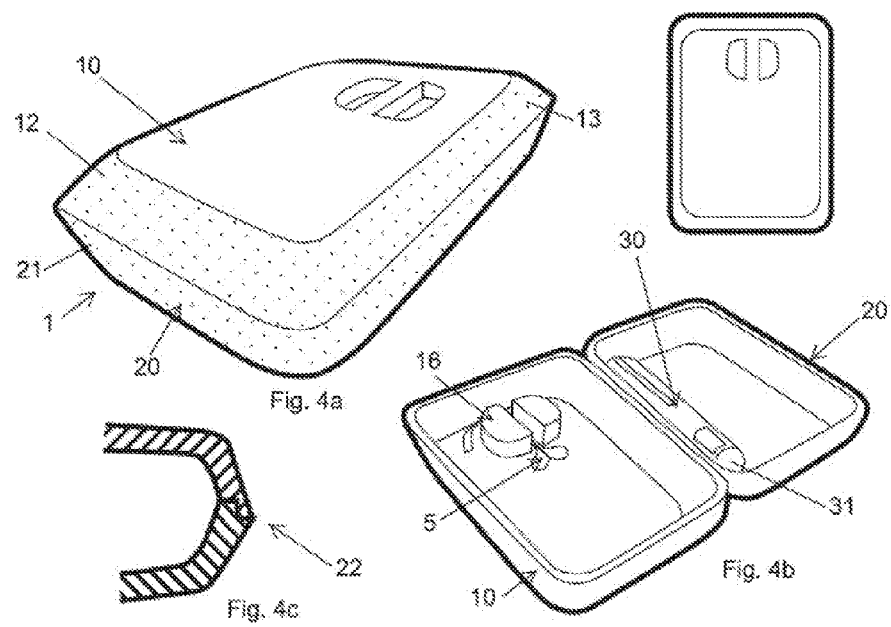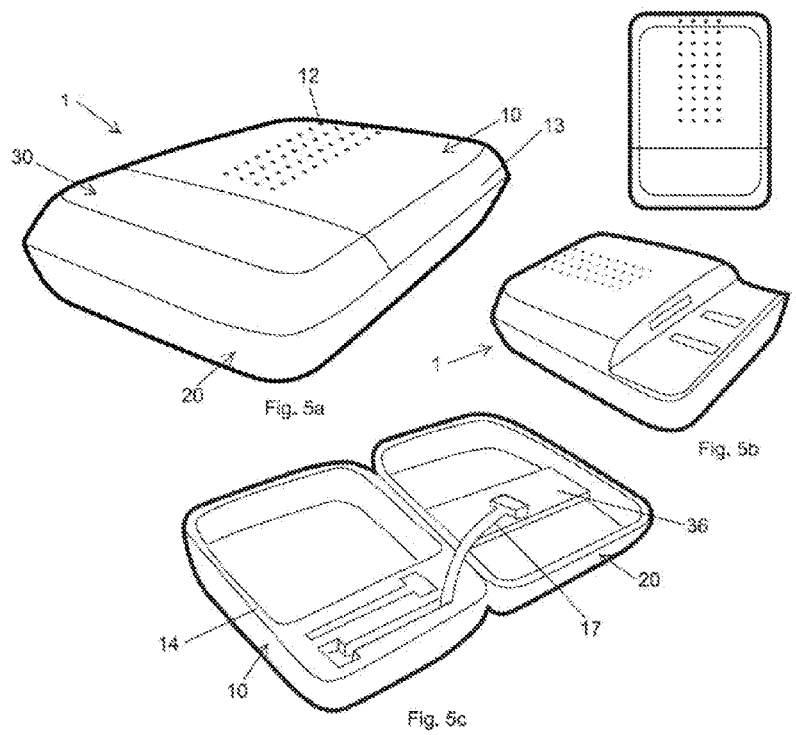

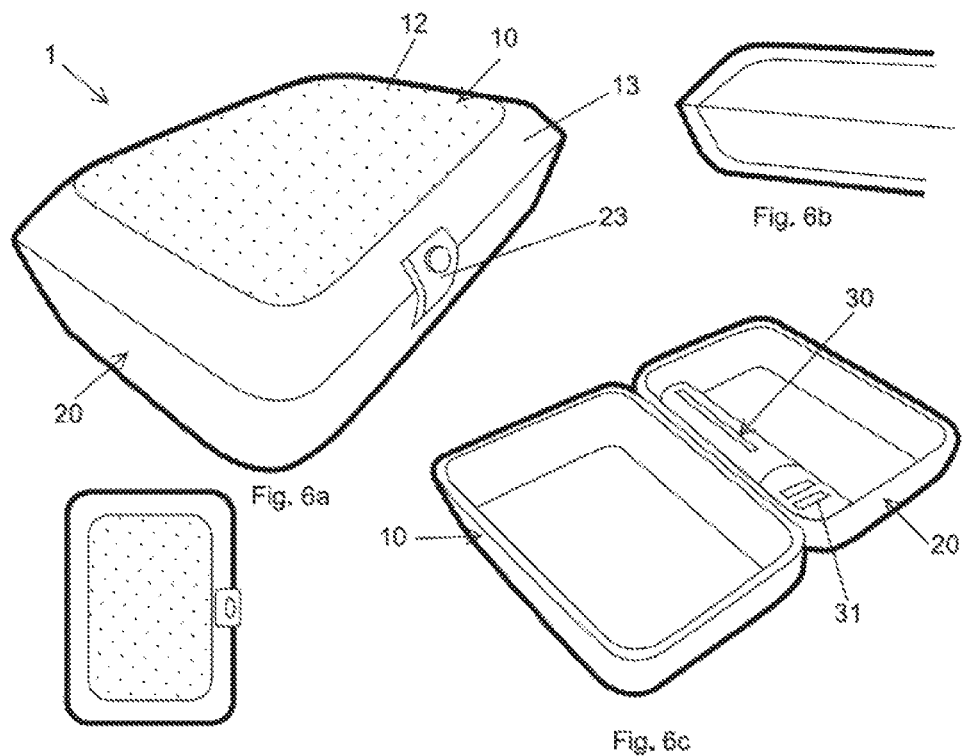
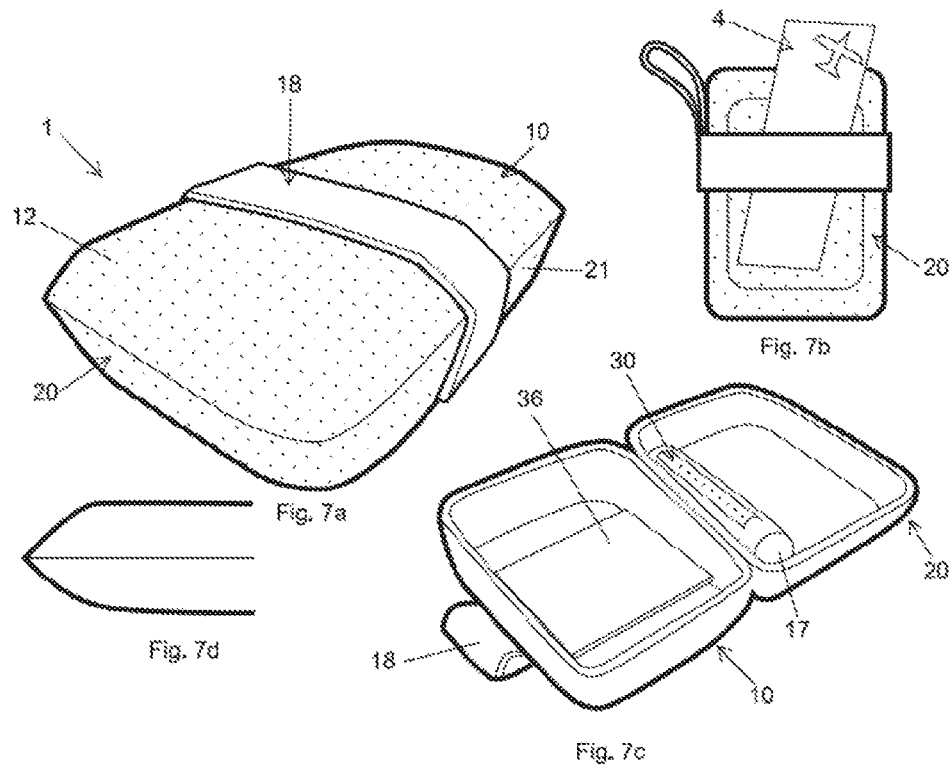

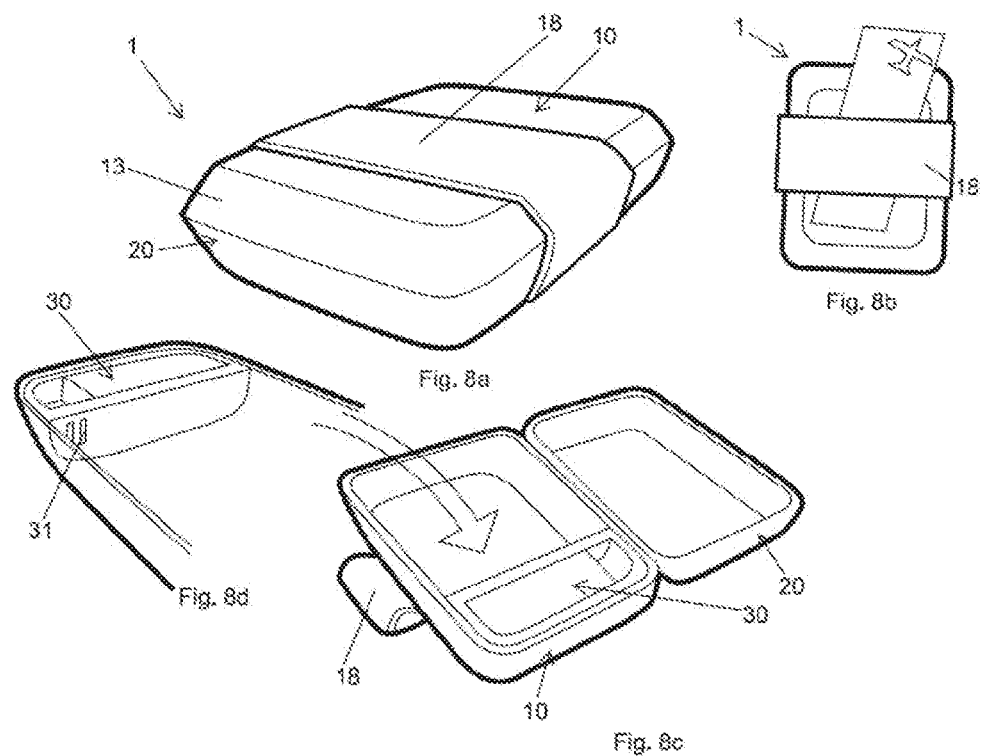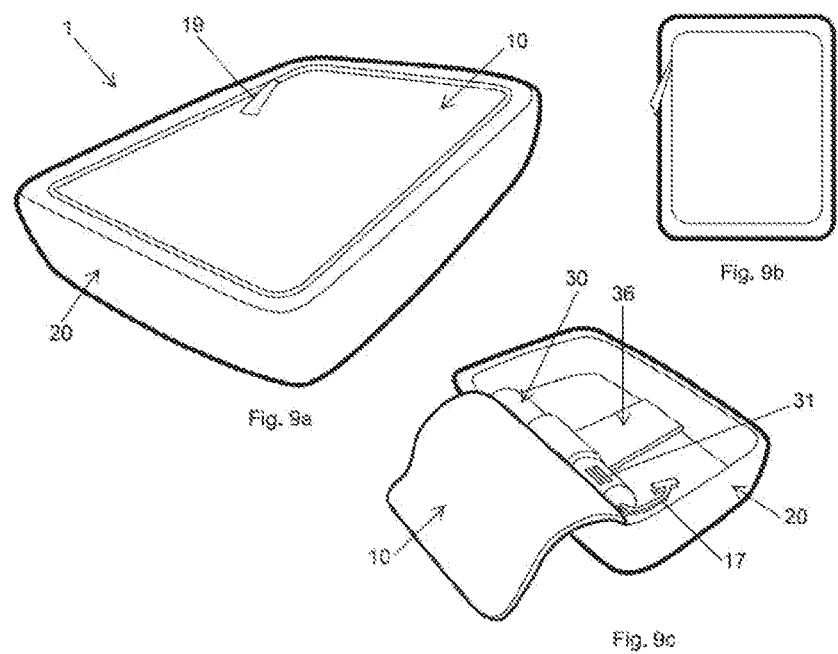

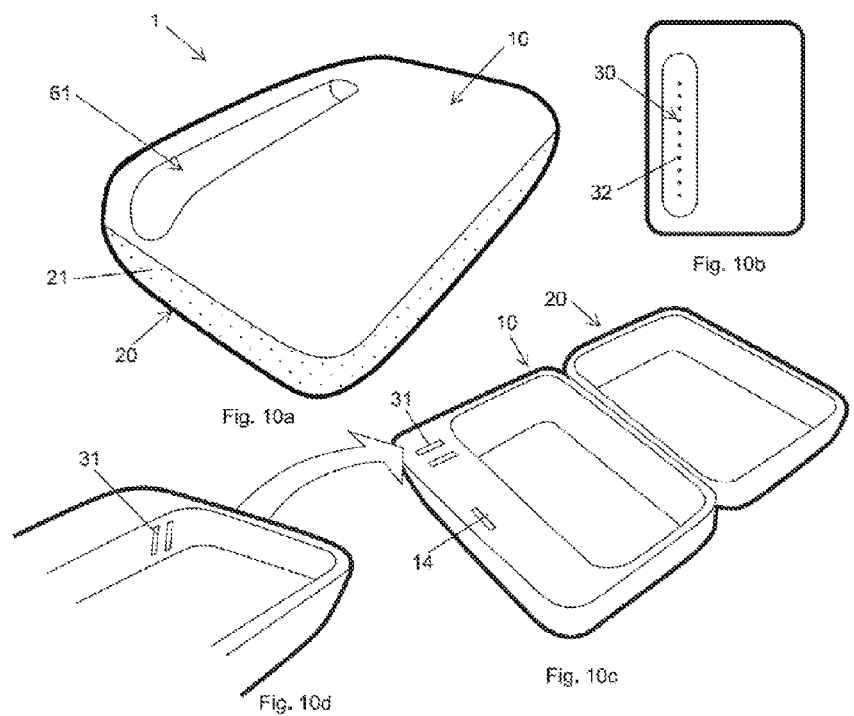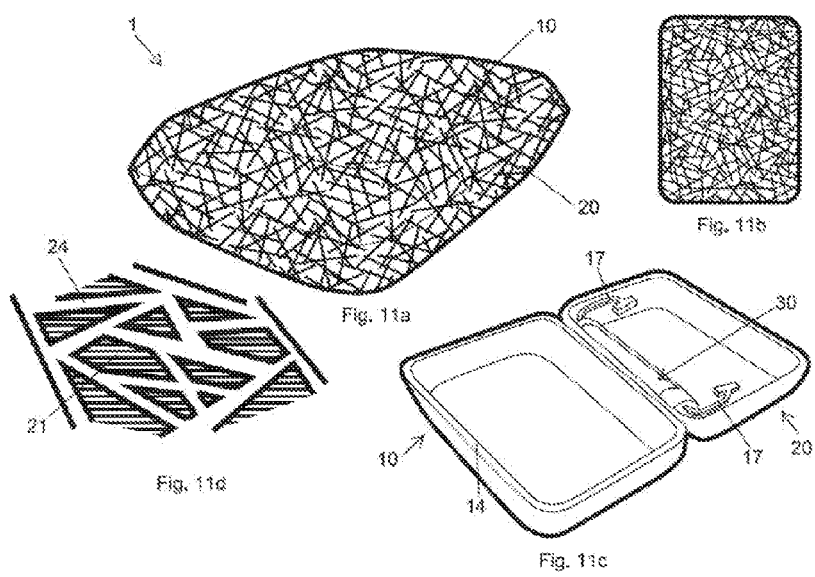

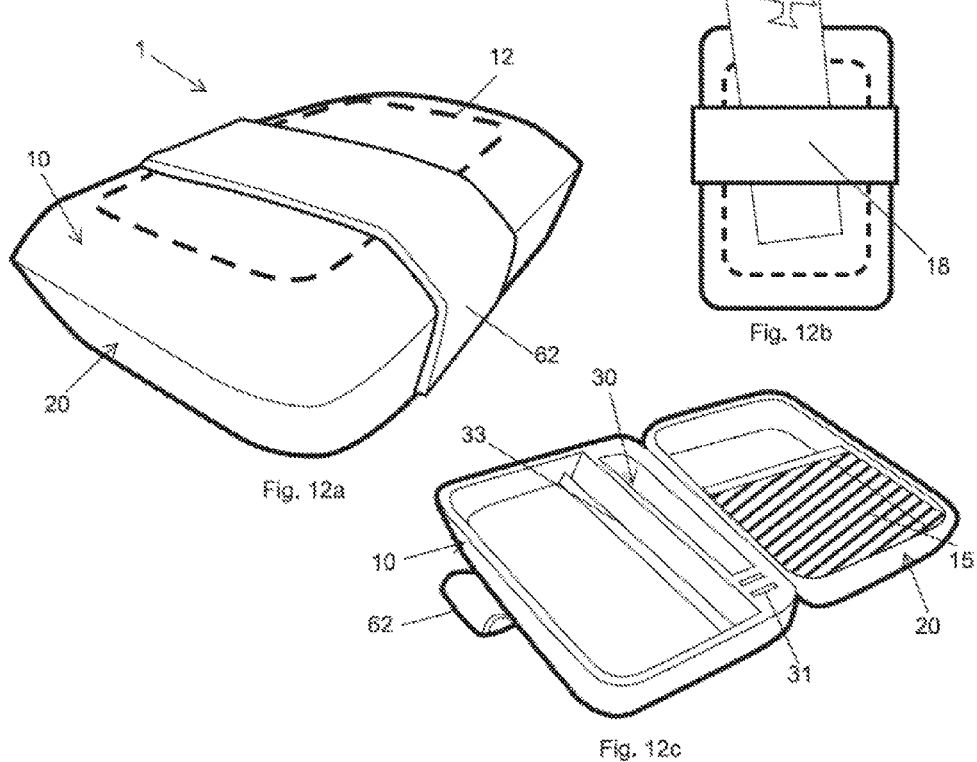

PORTABLE POWER SOURCE DEVICE

CROSS-REFERENCE TO RELATED APPLICATIONS

This application claims the benefit of U.S. Provisional Patent Application No. 62/063,415, filed Oct. 14, 2014, the entire content of which is hereby incorporated by reference.

FIELD OF THE TECHNOLOGY

The present application relates to a portable power source device.

BACKGROUND

Existing portable power source devices usually include a power source main body. The power source main body is provided with a battery and a control circuit board. The power source main body is also provided with I/O interfaces. When using the existing portable power source to charge a mobile terminal such as a mobile phone, a user needs to use a USB cable to connect the mobile phone with the portable power source. Since it is necessary to hold the portable power source, the USB cable and the mobile phone at the same time, it is very inconvenient to operate. Even if they are placed in a bag or on a desk, it is not well organized and inconvenient to use. It will also affect the appearance.

SUMMARY

In one aspect, the present application is directed to a portable power source device including a case including an upper shell and a lower shell hingedly connected with the upper shell by a living hinge, the upper and lower shells being formed with a plurality of ventilation holes for heat ventilation; a power source assembly embedded in a housing integrally formed with one of the upper and lower shells, the power source assembly including a battery, a control circuit board and at least one USB port; a power-indicating unit coupled with the power source assembly; a support frame mounted on an inner surface of the lower shell for supporting thereon an electronic device; and a fastener for fastening the upper and lower shells together, wherein the fastener is selected from the group consisting of magnetic fastener, press-fit fastener, elastic belt, Velco™ fastener, snap button and zipper.

In another aspect, the present application is directed to a portable power source device including a case including an upper shell and a lower shell; a power source assembly embedded in a housing integrally formed with one of the upper and lower shells, the power source assembly including a battery, a control circuit board and at least one USB interface; and a support frame mounted on an inner surface of the case for supporting thereon an electronic device.

The upper and lower shells may be hingedly connected together by a living hinge.

The support frame may include a slanted wall formed on the inner surface of one of the upper and lower shells, and a supporting ledge extending along a lower edge of the slanted wall.

The support frame may be defined by an elongate trough formed on the inner surface of one of the upper and lower shells in which one side of the electronic device can be inserted for supporting the electronic device.

The support frame may include a longitudinal strip having a proximal end hingedly connected with one of the upper and lower shells and a distal end formed with a transversely extending portion, and the longitudinal strip is movable from a stowed position where the strip is lying flat in a recess formed on the inner surface of the one of the upper and lower shells, and a raised position where the longitudinal strip is flipped out to a position where the transversely extending portion is located above the inner surface.

The support frame may include an elastic belt having a first end attached to one side of one of the upper and lower shells and an opposite end attached to an opposite side of the one of the upper and lower shells, whereby the electronic device can be held between the elastic belt and the inner surface of the one of the upper and lower shells.

The support frame may include a first plate fixedly connected on the inner surface of one of the upper and lower shells, a second plate having one side hingedly connected with the first plate, and a third plate hingedly connected with an opposite side of the second plate, whereby the first, second and third plates can be folded into a structure with a slanted surface to support thereon the electronic device.

The support frame may be defined by an elongate ridge integrally formed on an inner surface of one of the upper and lower shells.

The support frame may be in the form of a cross bar provided on and extending across opposite upper edges of a tray formed in one of the upper and lower shells.

The support frame may include two parallel and spaced apart guide rails mounted on the inner surface of one of the upper and lower shells, a first plate having first and second ends, and a second plate having first and second ends, and wherein the first ends of the first and second plates are hingedly connected, the second end of the first plate is fixedly connected with one end of the two guide rails, and the second end of the second plate is hingedly connected with a third plate which is slidably connected with an opposite end of the two guide rails, whereby the first, second and third plates are movable from a stowed position where the first, second and third plates are lying flat between the two guide rails, and a raised position where the third plate slides towards the first plate along the two guide rails until the first and second plates are disposed in slanted position with a slanted surface for supporting thereon the electronic device.

The portable power source device may further include a power-indicating unit being coupled with the power source assembly.

At least one of the upper and lower shells may be formed with a plurality of ventilation holes for heat ventilation.

The portable power source device may further include a built-in USB charging cable connected with the power source assembly.

The USB interface may be a USB port provided on a housing of the power source assembly.

A net pocket may be provided on the inner surface of one of the upper and lower shells.

A receptacle may be formed on an outer surface of one of the upper and lower shells for receiving therein the battery.

The upper and lower shells may be fastened together by a fastener selected from the group consisting of magnetic fastener, press-fit fastener, friction-fit fastener, elastic belt, Velco™ fastener, snap button and zipper.

The power source assembly may be detachably mounted on the case.

The upper shell may be made of a flexible material.

Although the portable power source device is shown and described with respect to certain embodiments, it is obvious that equivalents and modifications will occur to others skilled in the art upon the reading and understanding of the specification. The portable power source device in the present application includes all such equivalents and modifications, and is limited only by the scope of the claims.

BRIEF DESCRIPTION OF THE DRAWINGS

Specific embodiments of the portable power source device will now be described by way of example with reference to the accompanying drawings wherein:

FIGS. 2a-2c are illustrative diagrams showing a second embodiment of the portable power source device of the present application.

FIGS. 3a-3c are illustrative diagrams showing a third embodiment of the portable power source device of the present application.

FIGS. 4a-4c are illustrative diagrams showing a fourth embodiment of the portable power source device of the present application.

FIGS. 5a-5c are illustrative diagrams showing a fifth embodiment of the portable power source device of the present application.

FIGS. 6a-6c are illustrative diagrams showing a sixth embodiment of the portable power source device of the present application.

FIGS. 7a-7d are illustrative diagrams showing a seventh embodiment of the portable power source device of the present application.

FIGS. 8a-8d are illustrative diagrams showing an eighth embodiment of the portable power source device of the present application.

FIGS. 9a-9c are illustrative diagrams showing a ninth embodiment of the portable power source device of the present application.

FIGS. 10a-10d are illustrative diagrams showing a tenth embodiment of the portable power source device of the present application.

FIGS. 11a-11d are illustrative diagrams showing an eleventh embodiment of the portable power source device of the present application.

FIGS. 12a-12c are illustrative diagrams showing a twelve embodiment of the portable power source device of the present application.

DETAILED DESCRIPTION

Figure 1A:
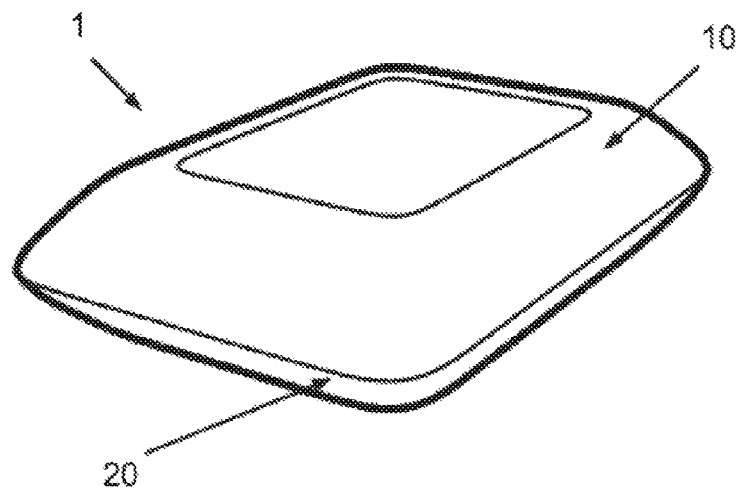
FIGS. 1a-1d are illustrative diagrams showing a first embodiment of the portable power source device of the present application.
Figure 1B:
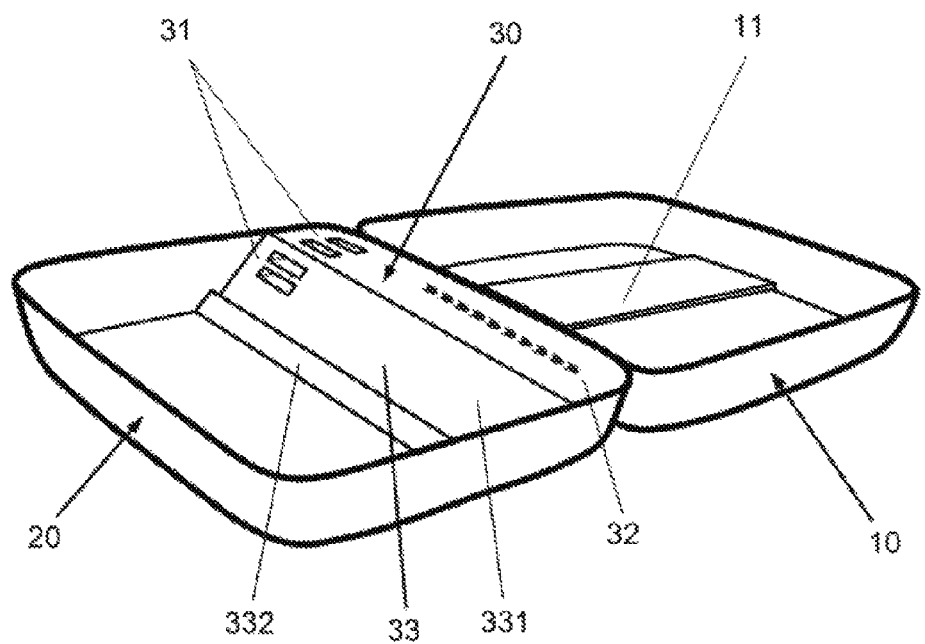
Figure 1C:
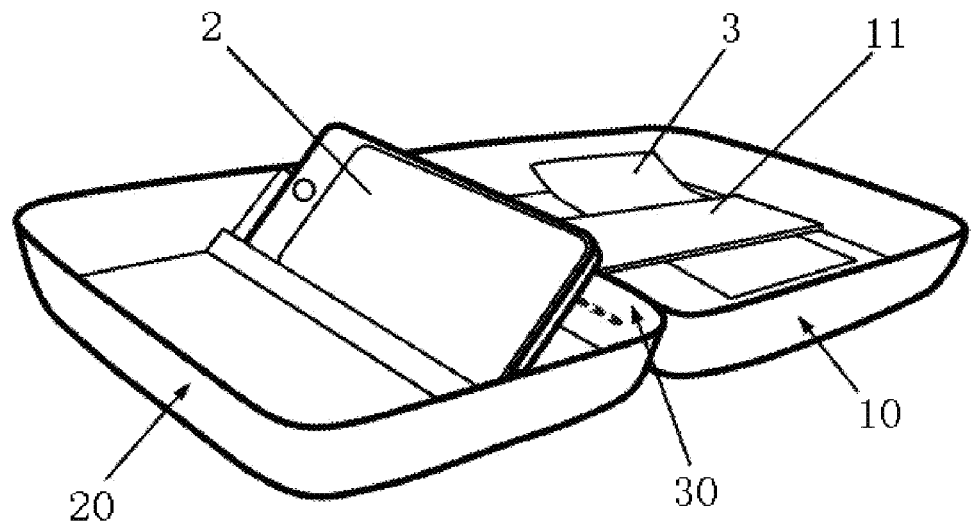
Figure 1D:
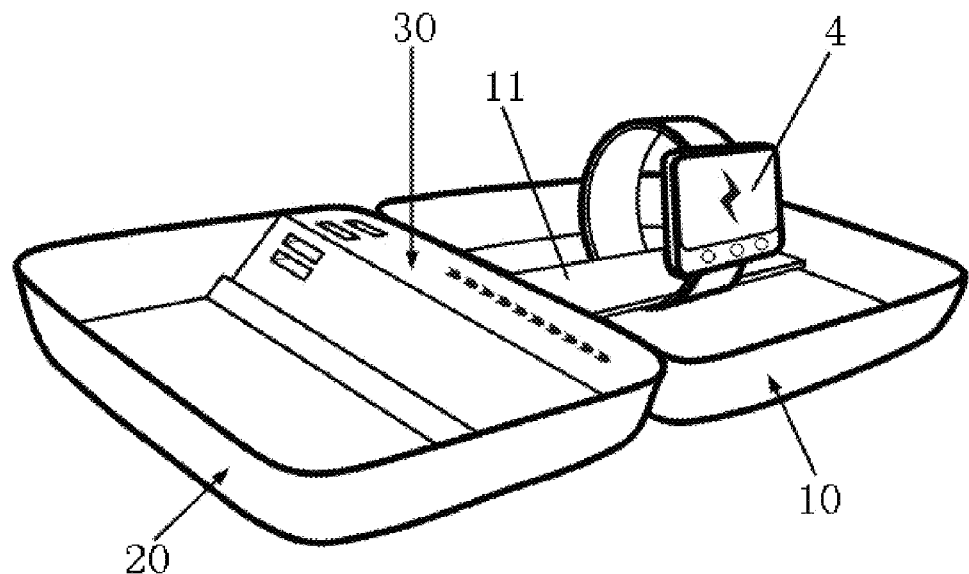

Reference will now be made in detail to a preferred embodiment of the portable power source device, examples of which are also provided in the following description. Exemplary embodiments of the portable power source device are described in detail, although it will be apparent to those skilled in the relevant art that some features that are not particularly important to an understanding of the portable power source device may not be shown for the sake of clarity.

Furthermore, it should be understood that the portable power source device is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the protection.

For illustration purposes, the terms "upper", "lower", "top" or "bottom" appeared hereinafter relate to the invention as it is oriented in the drawings. It is understood that the invention may assume various positions, except where expressly specified to the contrary. Furthermore, it is understood that the specific devices shown in the drawings, and described in the following description, are simply exemplary embodiments of the invention. Hence, specific dimensions and other physical characteristics related to the embodiments disclosed hereinafter are not to be considered as limiting.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

FIGS. 1a-1d are illustrative diagrams showing a first embodiment of the portable power source device of the present application. The portable power source device may include a case 1 having an upper shell 10 and a lower shell 20. The upper and lower shells 10, 20 can be hingedly connected together by a living hinge or any other suitable hinge. When the upper and lower shells 10, 20 are folded up, they can form a closed space. A power source assembly 30 may be embedded in a housing integrally formed with the lower shell 20 of the case 1. It is understood that the power source assembly 30 may be embedded in a housing integrally formed with the upper shell 10 instead. The power source assembly 30 may include a battery and a control circuit board. Four USB interfaces 31 may be provided on the power source assembly 30. A power-indicating unit 32 may also be provided on the power source assembly 30. A support frame 33 may be provided on an inner surface of the case 1 preferably adjacent to the power source assembly 30. The support frame 33 can be used to support thereon a mobile phone 2 or other electronic device. The upper shell 10 may be provided with an elastic belt 11. Banknote 3, travelling document and notepad can be held between the elastic belt 11 and the inner surface of the upper shell 10. An intelligent wristwatch 4 can also be held by the elastic belt 11 to facilitate charging of the wristwatch. If the mobile phone is not in use while being charged by the battery, the upper and lower shells 10, 20 can be folded up. The mobile phone can therefore be carried inside the case 1 formed by the upper and lower shells 10, 20. The case 1 is easy to carry and aesthetic. Although it has been shown and described that the case 1 is used to carry a mobile phone, it is understood that the case 1 can be used to carry intelligent wristbands, wireless earphones, music players, pedometers and other electronic and non-electronic devices.

In the first embodiment, the support frame 33 may include a slanted wall 331 formed on one of the upper and lower shells 10, 20, and a supporting ledge 332 extending along a lower edge of the slanted wall 331 for supporting thereon the electronic device. The power source assembly 30 may be provided behind the support frame 33. Although it has been shown in the drawings and described throughout the description that a feature is provided on the upper shell 10, it is understood that the feature may be provided on the lower shell 20 instead, and vice versa.

Figure 2A:
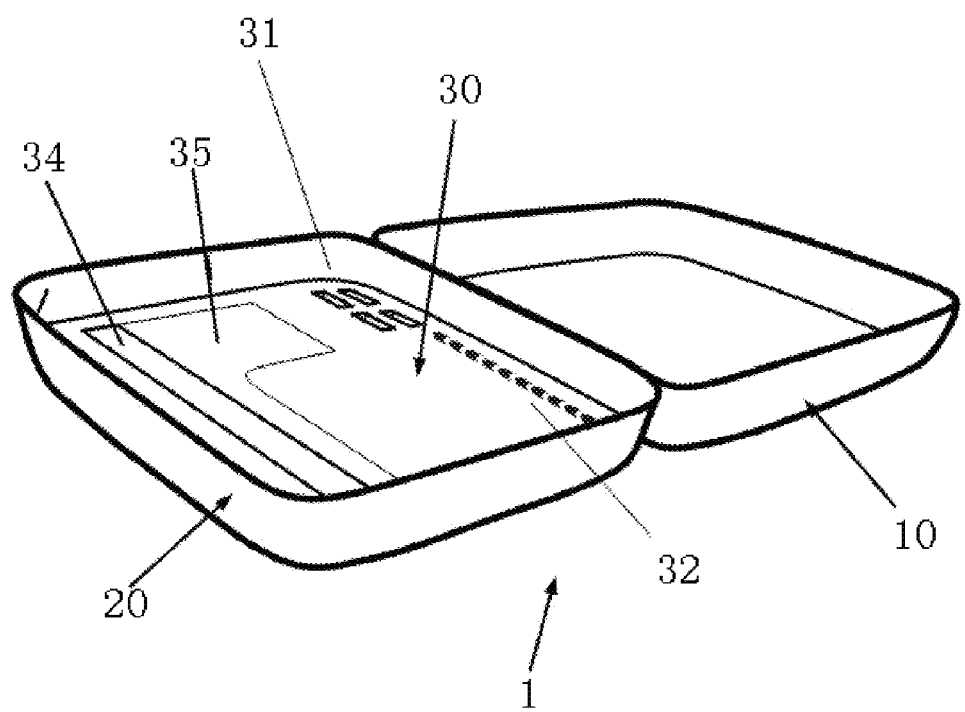
Figure 2B:
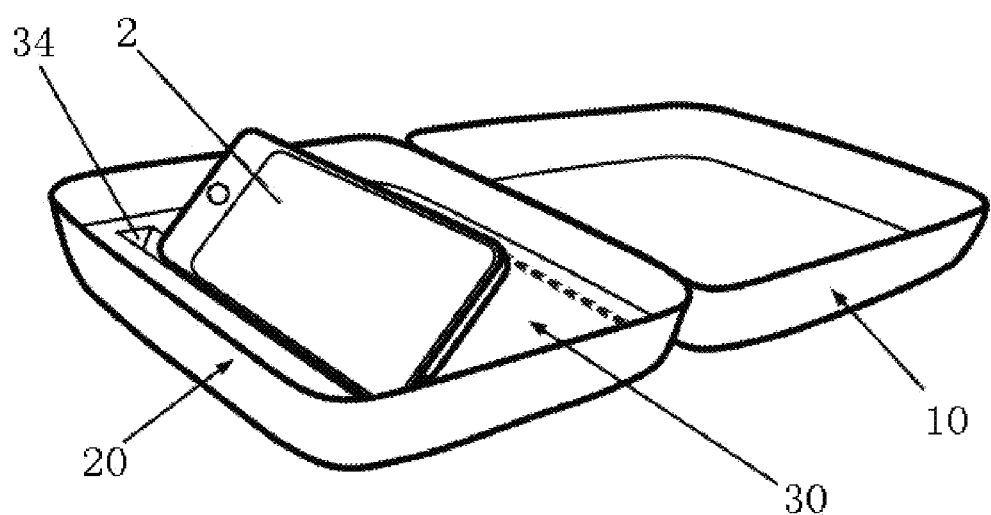

FIGS. 2a-2c are illustrative diagrams showing a second embodiment of the portable power source device of the present application. The structure of the portable power source device of the second embodiment is similar to the structure of the first embodiment. The portable power source device may include a case 1 having an upper shell 10 and a lower shell 20. The upper and lower shells 10, 20 can be hingedly connected together by a living hinge or any other suitable hinge. A power source assembly 30 may be provided on the lower shell 20 of the case 1. The power source assembly 30 may include a battery and a control circuit board. Four USB interfaces 31 may be provided on the power source assembly 30. A power-indicating unit 32 may also be provided on the power source assembly 30.

In the second embodiment, an elongate trough 34 may be formed on the lower shell 20. It is understood that the elongated trough 34 may be formed on the upper shell 10 instead. One side of a mobile phone 2 can be inserted into and supported by the elongate trough 34. In addition, a longitudinal strip 35 may be provided adjacent to the elongate trough 34. The longitudinal strip 35 may have a proximal end 351 hingedly connected with one of the upper and lower shells 10, 20 and a distal end 352 formed with a transversely extending portion 353, and the longitudinal strip 35 can be movable from a stowed position where the strip 35 is lying flat in a recess 354 formed on the inner surface of the one of the upper and lower shells 10, 20, and a raised position where the longitudinal strip 35 is flipped out to a position where the transversely extending portion 353 is located above the inner surface. An intelligent wristwatch 4 can be supported by the transversely extending portion 353.

FIGS. 3a-3c are illustrative diagrams showing a third embodiment of the portable power source device of the present application. The portable power source device may include a case 1 having an upper shell 10 and a lower shell 20. The upper and lower shells 10, 20 can be hingedly connected together at one side thereof by a living hinge or any other suitable hinge. The opposite side of the upper and lower shells 10, 20 can be fastened together by a magnetic fastener 14. The upper shell 10 may be formed with a plurality of ventilation holes 12 for heat ventilation. The periphery 13 of the outer surface of the upper shell 10 may have a slanted surface so as to provide a visual effect of a slim case. A net pocket 15 may be provided on an inner surface of the upper shell 10 for holding items. It is understood that the net pocket 15 may be provided on an inner surface of the lower shell 20 instead. A power source assembly 30 may be provided on the lower shell 20 and may be cylindrical in shape. The power source assembly 30 may include a battery and a control circuit board. A plurality of USB interfaces 31 may be provided at one side the power source assembly 30.

In the third embodiment, there is provided a support frame 36. The support frame 36 may include a first plate 361 fixedly connected with an inner surface of the lower shell 20, a second plate 362 having one side hingedly connected with the first plate 361, and a third plate 363 hingedly connected with an opposite side of the second plate 362, whereby the first, second and third plates 361, 362, 363 can be folded into a structure, similar to a kickstand structure, with a slanted surface to support an electronic device such as a video player. When the support frame 36 is not in use, the first, second and third plates 361, 362, 363 can by lying flat on the inner surface of the lower shell 20 and can be used to as a clip for holding banknote 3, notepad, travelling document, etc.

FIGS. 4a-4c are illustrative diagrams showing a fourth embodiment of the portable power source device of the present application. The portable power source device may include a case 1 having an upper shell 10 and a lower shell 20. The upper and lower shells 10, 20 can be hingedly connected together at one side by a living hinge, and frictionally fitted together at the opposite side by a press-fit or friction-fit fastener 22. The upper and lower shells 10, 20 may be formed with a plurality of ventilation holes 12 for heat ventilation. The periphery 13 of the outer surface of the upper shell 10 may have a slanted surface so as to provide a visual effect of a slim case. A cable-winding reel 16 may be integrally formed on an inner surface of the upper shell 10 for winding the cable of an earphone 5. The cable-winding reel 16 may also be used for the winding a USB cable. A power source assembly 30 may be provided on the lower shell 20 of the case 1. A plurality of USB interfaces 31 may be provided on the power source assembly 30.

FIGS. 5a-5c are illustrative diagrams showing a fifth embodiment of the portable power source device of the present application. The portable power source device may include a case 1 having an upper shell 10 and a lower shell 20. The upper and lower shells 10, 20 can be hingedly connected together at one side thereof by a living hinge or any other suitable hinge. The opposite side of the upper and lower shells 10, 20 can be fastened together by a magnetic fastener 14. The upper shell 10 may be formed with a plurality of ventilation holes 12 for heat ventilation. The periphery 13 of the outer surface of the upper shell 10 may have a slanted surface so as to provide a visual effect of a slim case. A power source assembly 30 may be detachably connected with the upper shell 10 of the case 1. A USB cable 17 may be provided on the upper shell 10. One end of the USB cable 17 may be connected with the power source assembly 30. The other end of the USB cable 17 can be connected with a mobile terminal such as a mobile phone for charging. A support frame 36, similar to the support frame 36 of the third embodiment, may be provided on an inner surface of the lower shell 20.

FIGS. 6a-6c are illustrative diagrams showing a sixth embodiment of the portable power source device of the present application. The portable power source device may include a case 1 having an upper shell 10 and a lower shell 20. The upper and lower shells 10, 20 can be hingedly connected together at one side by a living hinge, and fastened together at the opposite side by a snap button 23. The upper shell 10 may be formed with a plurality of ventilation holes 12 for heat ventilation. The periphery 13 of the outer surface of the upper shell 10 may have a slanted surface so as to provide a visual effect of a slim case. A power source assembly 30 may be provided on the lower shell 20. A plurality of USB interfaces 31 may be provided on the power source assembly 30.

FIGS. 7a-7d are illustrative diagrams showing a seventh embodiment of the portable power source device of the present application. The portable power source device may include a case 1 having an upper shell 10 and a lower shell 20. The upper and lower shells 10, 20 can be hingedly connected together by a living hinge or any other suitable hinge. An elastic belt 18 may be provided on the upper shell 10. The elastic belt 18 may wrap around the upper and lower shells 10, 20 for securely holding the upper and lower shell 10, 20 together. Banknote, notepad and travelling document 4 can be held between the elastic belt 18 and the outer surfaces of the case 1. The upper and lower shells 10, 20 may be formed with a plurality of ventilation holes 12 for heat ventilation. The periphery 13 of the outer surface of the upper shell 10 may have a slanted surface so as to provide a visual effect of a slim case. A power source assembly 30 may be provided on the lower shell 20. A plurality of USB interfaces 31 may be provided at one side of the power source assembly 30. A support frame 36, similar to the support frame 36 of the third embodiment, may be provided on an inner surface of the upper shell 10.

FIGS. 8a-8d are illustrative diagrams showing an eighth embodiment of the portable power source device of the present application. The portable power source device may include a case 1 having an upper shell 10 and a lower shell 20. The upper and lower shells 10, 20 can be hingedly connected together by a living hinge or any suitable hinge. An elastic belt 18 may be provided on the upper shell 10. The elastic belt 18 may wrap around the upper and lower shells 10, 20 for securely holding the upper and lower shells 10, 20 together. Banknote, notepad and travelling document can be held between the elastic belt 18 and the outer surfaces of the case 1. The periphery 13 of the outer surface of the upper shell 10 may have a slanted surface so as to provide a visual effect of a slim case. A power source assembly 30 may be provided on the upper shell 10. A plurality of USB interfaces 31 may be provided at one end of the power source assembly 30.

FIGS. 9a-9c are illustrative diagrams showing a ninth embodiment of the portable power source device of the present application. The portable power source device may include a case 1 having an upper shell 10 and a lower shell 20. The upper and lower shells 10, 20 can be connected together at one side thereof. A zipper 19 may be used to connect the other sides of the upper and lower shells 10, 20. The upper shell 10 may be made of fabric or other flexible material. The capacity of the case 1 of this embodiment can be expanded due to the flexibility of the upper shell 10. A power source assembly 30 may be provided on the lower shell 20. A plurality of USB interfaces 31 and a USB cable 17 may be provided at one end of the power source assembly 30. A support frame 36, similar to the support frame 36 of the third embodiment, may be provided on an inner surface of the lower shell 20.

FIGS. 10a-10d are illustrative diagrams showing a tenth embodiment of the portable power source device of the present application. The portable power source device may include a case 1 having an upper shell 10 and a lower shell 20. The upper and lower shells 10, 20 can be hingedly connected together at one side thereof by a living hinge or any suitable hinge. The opposite side of the upper and lower shells 10, 20 can be fastened together by a magnetic fastener 14. The lower shell 20 may be formed with ventilation holes 21 for heat ventilation. The periphery of the outer surface of the upper shell 10 may have a rounded contour so as to provide a visual effect of a slim case. A power source assembly 30 may be detachably attached in a receptacle 61 formed on the upper shell 10. The power source assembly 30 may be provided with a power-indicating unit 32. A plurality of USB interfaces 31 may be provided on an inner surface of the upper shell 10.

FIGS. 11a-11d are illustrative diagrams showing an eleventh embodiment of the portable power source device of the present application. The portable power source device may include a case 1 having an upper shell 10 and a lower shell 20. The upper and lower shells 10, 20 can be hingedly connected together at one side thereof by a living hinge or any suitable hinge. The opposite side of the upper and lower shells 10, 20 can be fastened together by a magnetic fastener 14. The upper and lower shells 10, 20 may be formed with a plurality of ventilation holes 21 for heat ventilation. The structure of the upper shell 10 may be similar to the structure of the lower shell 20. The upper shell 10 may be a net-shaped mesh support framework 24 formed by injection molding. The net-shaped mesh support framework 24 may define the ventilation holes 21 for heat ventilation. A power source assembly 30 may be provided on the lower shell 20. A plurality of USB cables 17 may be provided at two opposite sides of the power source assembly 30.

FIGS. 12a-12c are illustrative diagrams showing a twelve embodiment of the portable power source device of the present application. The portable power source device may include a case 1 having an upper shell 10 and a lower shell 20. The upper and lower shells 10, 20 can be hingedly connected together at one side by a living hinge or any suitable hinge. The opposite side of the upper and lower shells 10, 20 can be fastened together by a Velco™ fastener 62. The upper shell 10 may be formed with a plurality of ventilation holes 12 for heat ventilation. The periphery 13 of the outer surface of the upper shell 10 may have a slanted surface so as to provide a visual effect of a slim case. A net pocket 15 may be provided on an inner surface of the lower shell 20 for holding items. It is understood that the net pocket 15 may be provided on an inner surface of the upper shell 10. A power source assembly 30 may be provided on the upper shell 10. A plurality of USB interfaces 31 may be provided on the power source assembly 30. A support frame 33, similar to the support frame 33 of the first embodiment, may be provided on the upper shell 10. An elastic belt 18 may be provided on the upper shell 10. The elastic belt 18 may wrap around the upper and lower shells 10, 20. Banknote, notepad and travelling document can be held between the elastic belt 18 and the outer surfaces of the case 1.

Figure 13A:
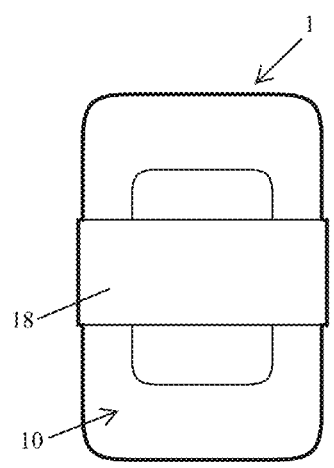
FIGS. 13a-13c are illustrative diagrams showing a thirteenth embodiment of the portable power source device of the present application.
Figure 13B:
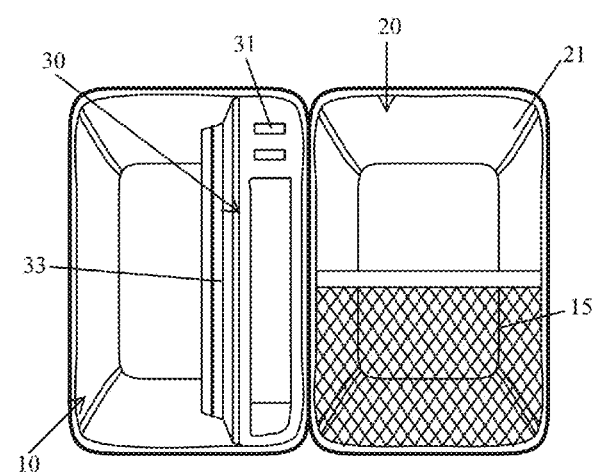
Figure 13C:

FIGS. 13a-13c are illustrative diagrams showing a thirteenth embodiment of the portable power source device of the present application. The portable power source device may include a case 1 having an upper shell 10 and a lower shell 20. The upper and lower shells 10, 20 can be connected together at one side by a living hinge. An elastic belt 18 may be provided on the upper shell 10. The elastic belt 18 may wrap around the upper and lower shells 10, 20. Banknote, notepad and travelling document can be held between the elastic belt 18 and the outer surfaces of the case 1. The lower shell 20 may be formed with a plurality of ventilation holes 21 for heat ventilation. A net pocket 15 may be provided on an inner surface of the lower shell 20 for holding items. A power source assembly 30 may be provided on the upper shell 10 of the case 1. A plurality of USB interfaces 31 may be provided on the power source assembly 30. A support frame 33, similar to the support frame 33 of the first embodiment, may be provided on a housing of the power source assembly 30.

Figures 14A, 14B, 14C:
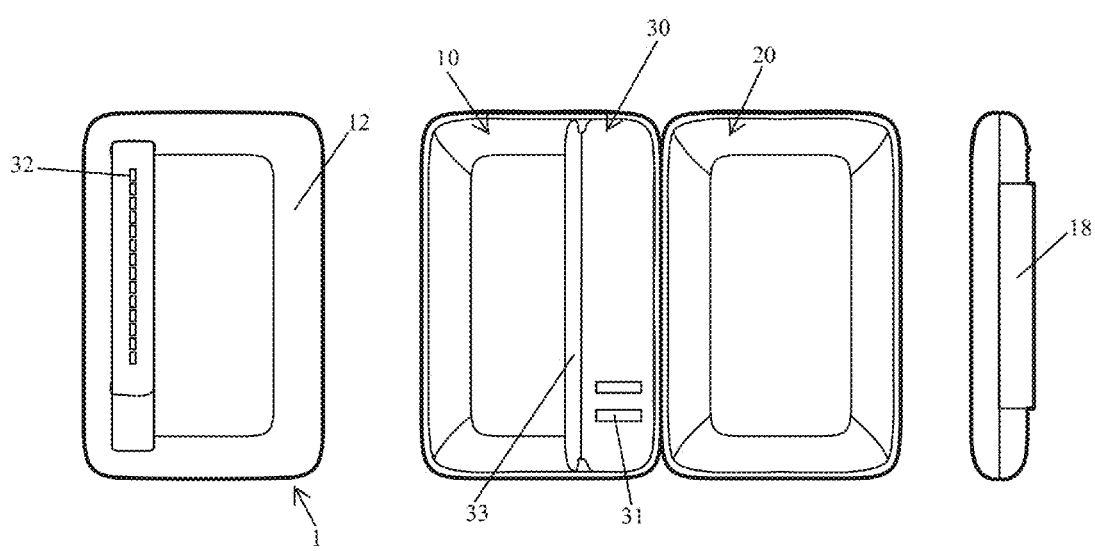
FIGS. 14a-14c are illustrative diagrams showing a fourteenth embodiment of the portable power source device of the present application.

FIGS. 14a-14c are illustrative diagrams showing a fourteenth embodiment of the portable power source device of the present application. The portable power source device may include a case 1 having an upper shell 10 and a lower shell 20. The upper and lower shells 10, 20 can be hingedly connected together by a living hinge or any suitable hinge. An elastic belt 18 may be provided on the upper shell 10. The elastic belt 18 may wrap around the upper and lower shells 10, 20 to securely hold the upper and lower shells 10, 20 together. Banknote, notepad and travelling document can be held between the elastic belt 18 and the lower shell 20. A power source assembly 30 may be provided on the upper shell 20 of the case 1. A plurality of USB interfaces 31 may be provided on the power source assembly 30. A support frame 33, similar to the support frame 33 of the first embodiment, may be provided on one side of a housing of the power source assembly 30. A power-indicating unit 32 may be provided on an outer surface of the upper shell 10 for easy observation of the condition of power consumption.

Figure 15A:
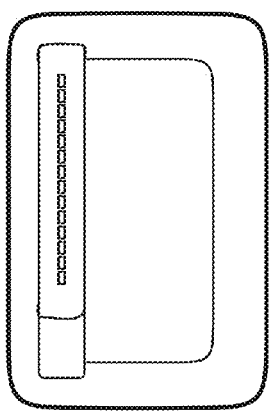
FIGS. 15a-15c are illustrative diagrams showing a fifteenth embodiment of the portable power source device of the present application.
Figure 15B:
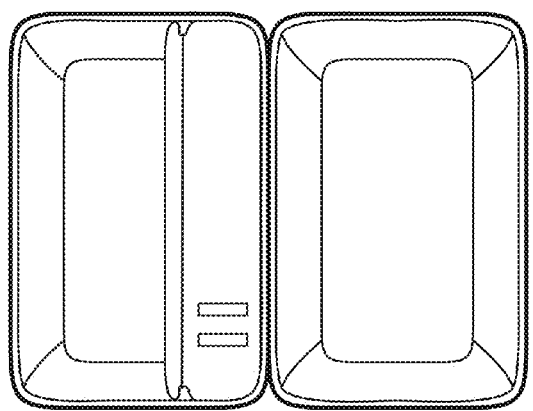
Figure 15C:

FIGS. 15a-15c are illustrative diagrams showing a fifteenth embodiment of the portable power source device of the present application. The structure of the portable power source device of the fifteenth embodiment is similar to that of the fourteenth embodiment, except that the upper and lower shells 10, 20 are fastened together by a magnetic fastener instead of an elastic belt.

Figures 16A, 16B, 16C:
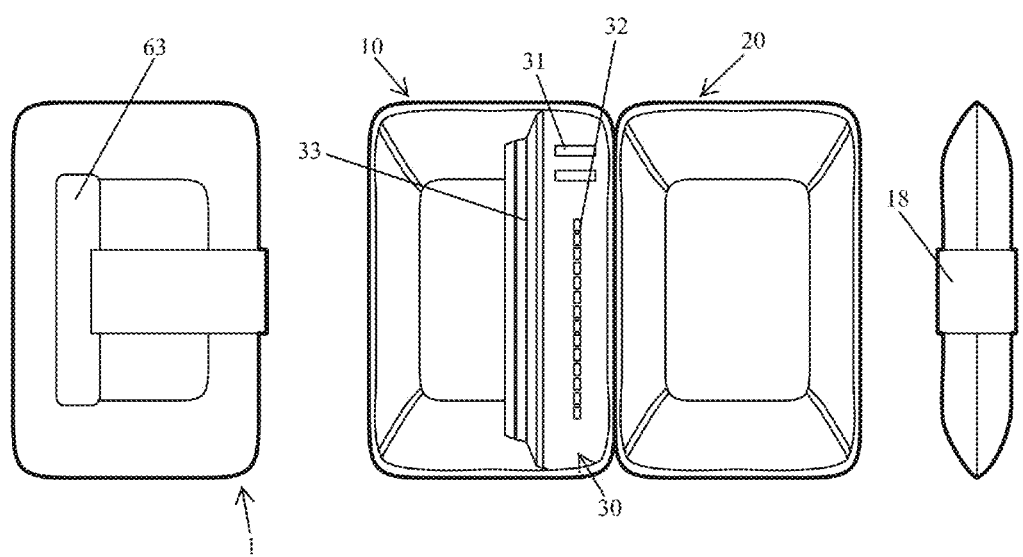
FIGS. 16a-16c are illustrative diagrams showing a sixteenth embodiment of the portable power source device of the present application.

FIGS. 16a-16c are illustrative diagrams showing a sixteenth embodiment of the portable power source device of the present application. The portable power source device may include a case 1 having an upper shell 10 and a lower shell 20. The upper and lower shells 10, 20 can be hingedly connected together by a living hinge or any suitable hinge. An elastic belt 18 may be provided on the upper shell 10. The elastic belt 18 may wrap around the upper and lower shells 10, 20 to securely hold the upper and lower shells 10, 20 together. Banknote, notepad and travelling document can be held between the elastic belt 18 and the case 1. A power source assembly 30 may be provided on the upper shell 20 of the case 1. A plurality of USB interfaces 31 may be provided on the power source assembly 30. A support frame 33, similar to the support frame 33 of the first embodiment, may be provided on one side of a housing of the power source assembly 30. A window 63 may be formed on the upper shell 10 so that a battery of the power source assembly 30 can be inserted into the case 1 from outside. The power source assembly 30 may be provided with a power-indicating unit 32 for easy observation of the condition of power consumption.

Figures 17A, 17B, 17C:
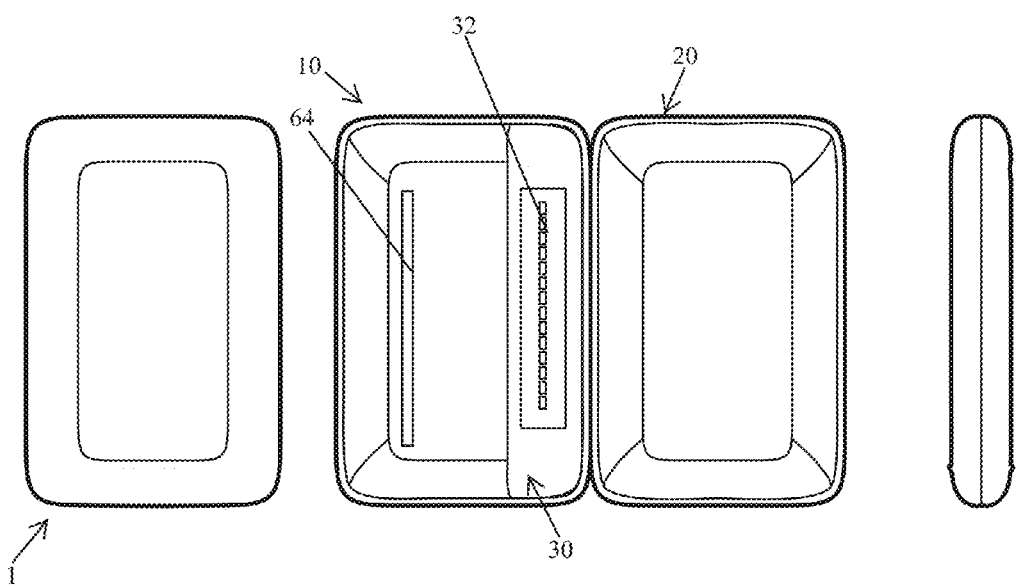
FIGS. 17a-17c are illustrative diagrams showing a seventeenth embodiment of the portable power source device of the present application.

FIGS. 17a-17c are illustrative diagrams showing a seventeenth embodiment of the portable power source device of the present application. The portable power source device may include a case 1 having an upper shell 10 and a lower shell 20. The upper and lower shells 10, 20 can be hingedly connected together at one side thereof by a living hinge. Similarly, the opposite side of the upper and lower shells 10, 20 can be fastened together by a magnetic fastener, and the upper and lower shells 10, 20 may be formed with ventilation holes for heat ventilation. A power source assembly 30 may be provided in the upper shell 10. A plurality of USB interfaces 31 may be provided on the power source assembly 30. The power source assembly 30 may be provided with a power-indicating unit 32. A support frame 64, in the form of an elongate ridge, may be integrally formed on an inner surface of the upper shell 10 for supporting a terminal such as a mobile phone.

Figures 18A, 18B, 18C:
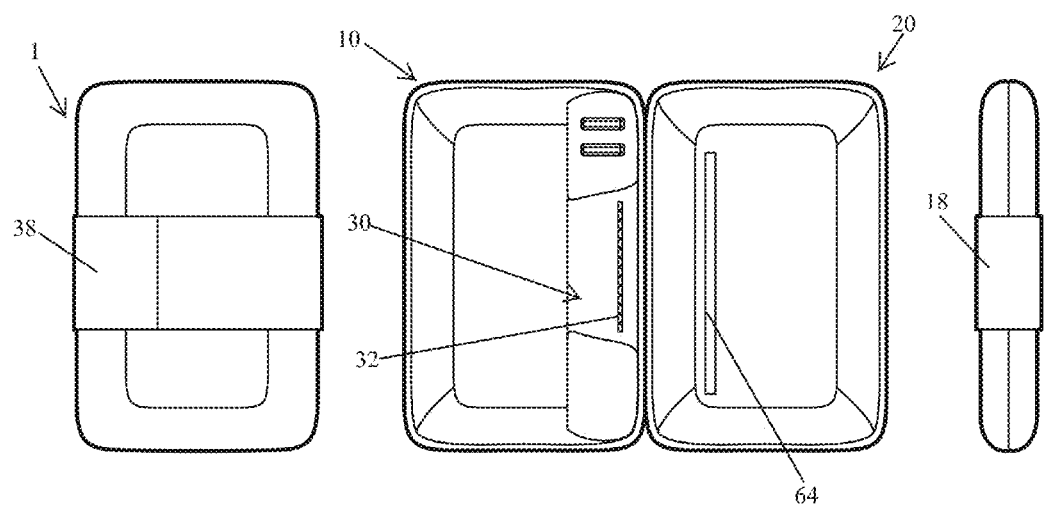
FIGS. 18a-18c are illustrative diagrams showing an eighteenth embodiment of the portable power source device of the present application.
Figure 19A:
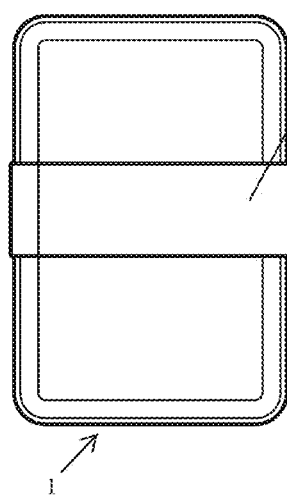
FIGS. 19a-19d are illustrative diagrams showing a nineteenth embodiment of the portable power source device of the present application.
Figure 19B:
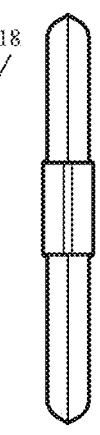
Figure 19C:
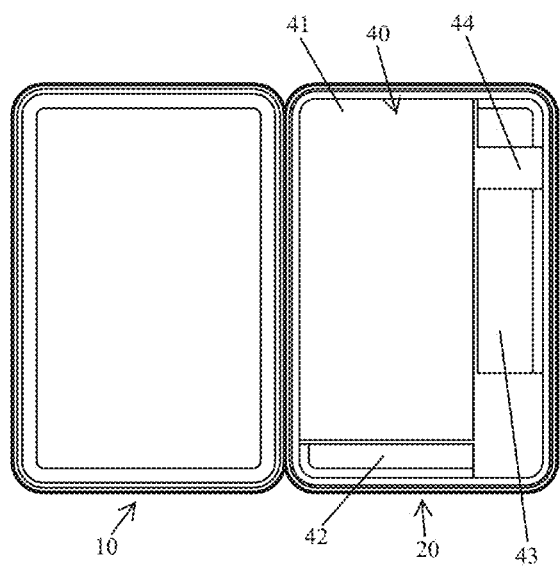
Figure 19D:
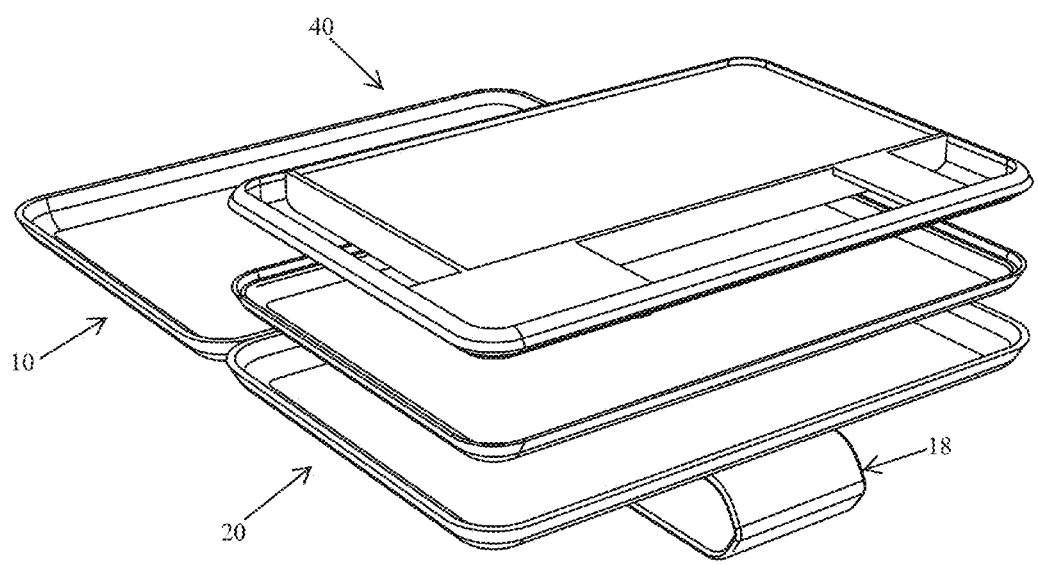
Figure 20A:
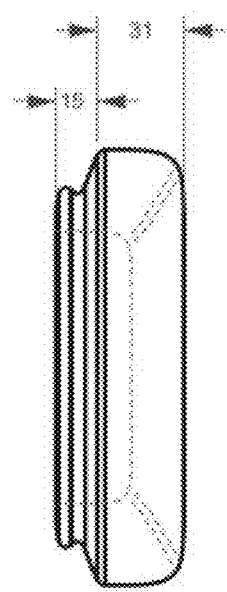
FIGS. 20a-20d are different views of an embodiment of power source assembly of the present application.
Figure 20B:
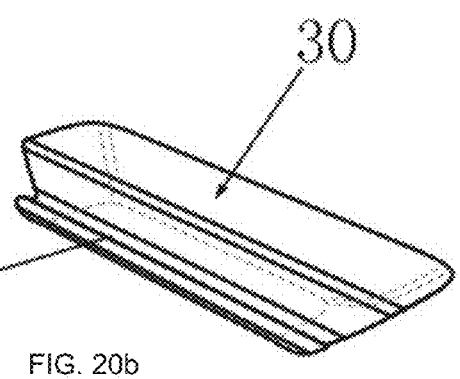
Figure 20C:
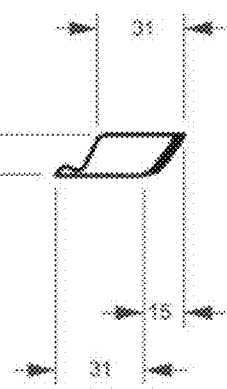
Figure 20D:
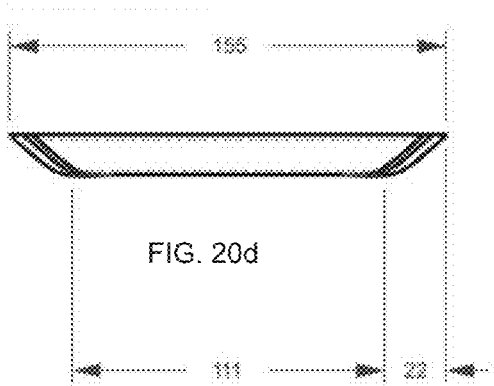
Figure 21:
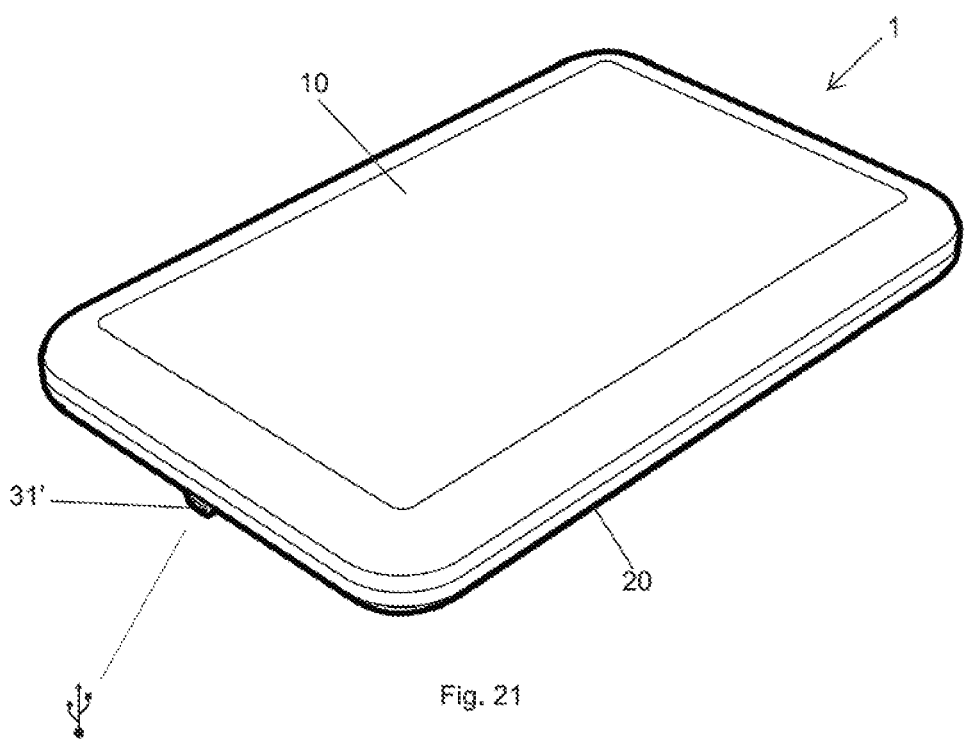
FIG. 21 is a perspective view of a twentieth embodiment of the portable power source device of the present application.

FIGS. 18a-18c are illustrative diagrams showing an eighteenth embodiment of the portable power source device of the present application. The portable power source device may include a case 1 having an upper shell 10 and a lower shell 20. The upper and lower shells 10, 20 can be hingedly connected together by a living hinge or any suitable hinge. An elastic belt 18 may be provided on the upper shell 10. The elastic belt 18 may wrap around the upper and lower shells 10, 20 to securely hold the upper and lower shells 10, 20 together. Banknote, notepad and travelling document can be held between the elastic belt 18 and the case 1. The upper and lower shells 10, 20 may be formed with ventilation holes for heat ventilation. A power source assembly 30 may be provided on the upper shell 20 of the case 1. A plurality of USB interfaces 31 may be provided on the power source assembly 30. The power source assembly 30 may be provided with a power-indicating unit 32 for easy observation of the condition of power consumption. An external battery 38 may be provided on an outer surface of the upper shell 10. The external battery 38 may be covered and secured by the elastic belt 18 when it is wrapped around the upper and lower shells 10, 20. A support frame 64, in the form of an elongate ridge, may be integrally formed on an inner surface of the lower shell 20 for supporting a terminal such as a mobile phone.

FIGS. 19a-19d are illustrative diagrams showing a nineteenth embodiment of the portable power source device of the present application. The portable power source device may include a case 1 having an upper shell 10 and a lower shell 20. The upper and lower shells 10, 20 can be hingedly connected together by a living hinge or any suitable hinge. An elastic belt 18 may be provided on the upper shell 10. The elastic belt 18 may wrap around the upper and lower shells 10, 20 to securely hold the upper and lower shells 10, 20 together. Banknote, notepad and travelling document can be held between the elastic belt 18 and the case 1. The upper and lower shells 10, 20 may be formed with ventilation holes for heat ventilation. A tray unit 40 may be provided in the lower shell 20. The tray unit 40 may be formed with a first tray 41 sized and shaped to hold a mobile phone, a second tray 42 sized and shaped to hold a connection cable, a third tray 43 sized and shaped to hold an intelligent wristwatch, and a support frame 44 for supporting the intelligent wristwatch while being charged. The support frame 44 may be in the form of a cross bar provided on and extending across opposite upper edges of the third tray 43. The tray unit 40 may have a double-layer structure formed by injection molding. A power source assembly 30 may be provided below the first tray 41.

FIGS. 20a-20d are different views of an embodiment of power source assembly 30 of the present application. The power source assembly 30 may include an outer housing. A battery and a control circuit board can be provided inside the housing. The battery can be a rechargeable battery or an ordinary replaceable battery. The power source assembly 30 may be provided with a plurality of USB interfaces, or USB cables. One side of the power source assembly 30 may be provided with a support frame 33 for supporting an electronic device such as a mobile phone to facilitate using and/or changing of the electronic device. The housing of the power source assembly 30 may be integrally formed with the support frame 33.

FIGS. 21-25 are different views of a twentieth embodiment of the portable power source device of the present application. The portable power source device may include a case 1 having an upper shell 10 and a lower shell 20. The upper and lower shells 10, 20 can be hingedly connected together by a living hinge or any other suitable hinge. A power source assembly 30 may be provided on one side of the upper shell 10. The power source assembly 30 may include a battery and a control circuit board. A plurality of USB interfaces 31, 31' may be provided on the power source assembly 30. A power-indicating unit 32 may also be provided on the power source assembly 30. Elastic belts 68 may be provided on an inner surface of the upper shell 10 for holding items such as banknote, notepad and travelling document, etc.

Figure 22:
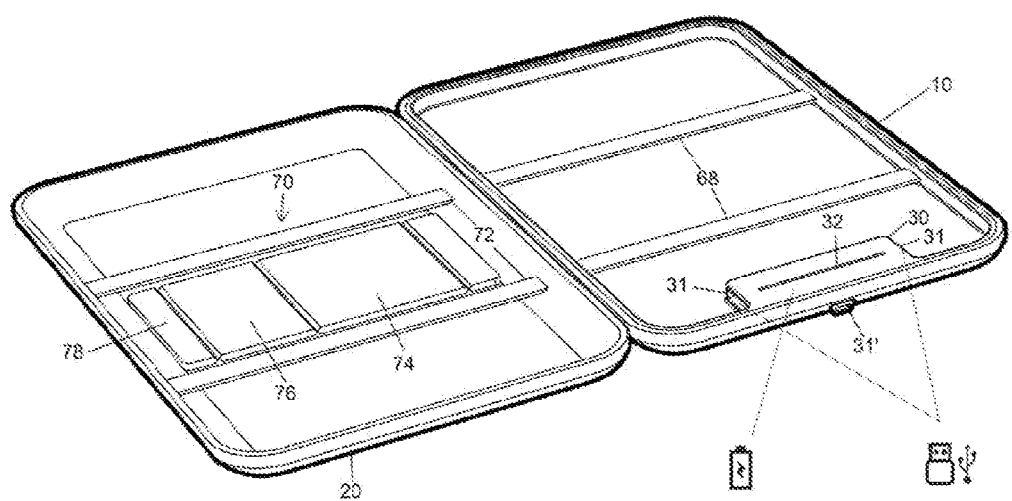
FIG. 22 is a perspective view of an opened portable power source device of FIG. 21 showing a support frame in a stowed position.
Figure 23:
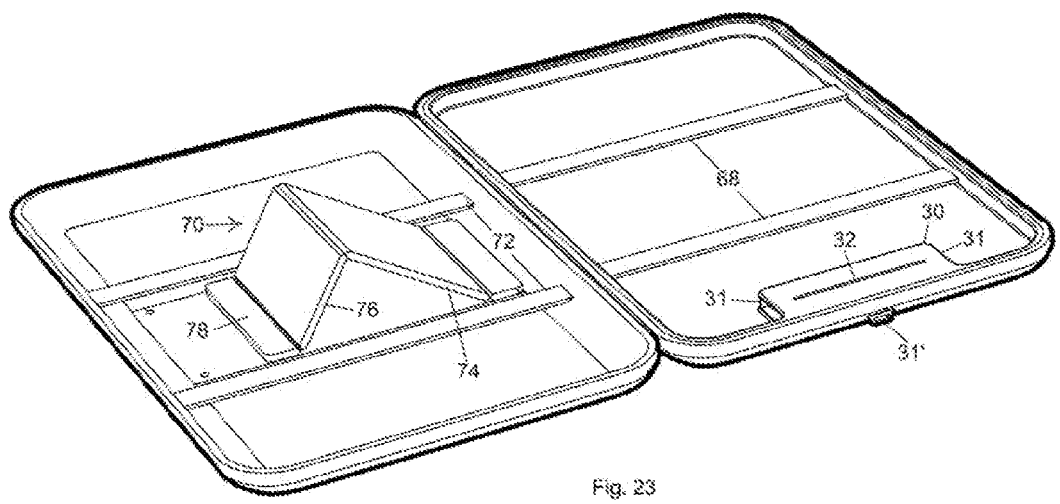
FIG. 23 is a perspective view of an opened portable power source device of FIG. 21 showing a support frame in a raised position.
Figure 24:
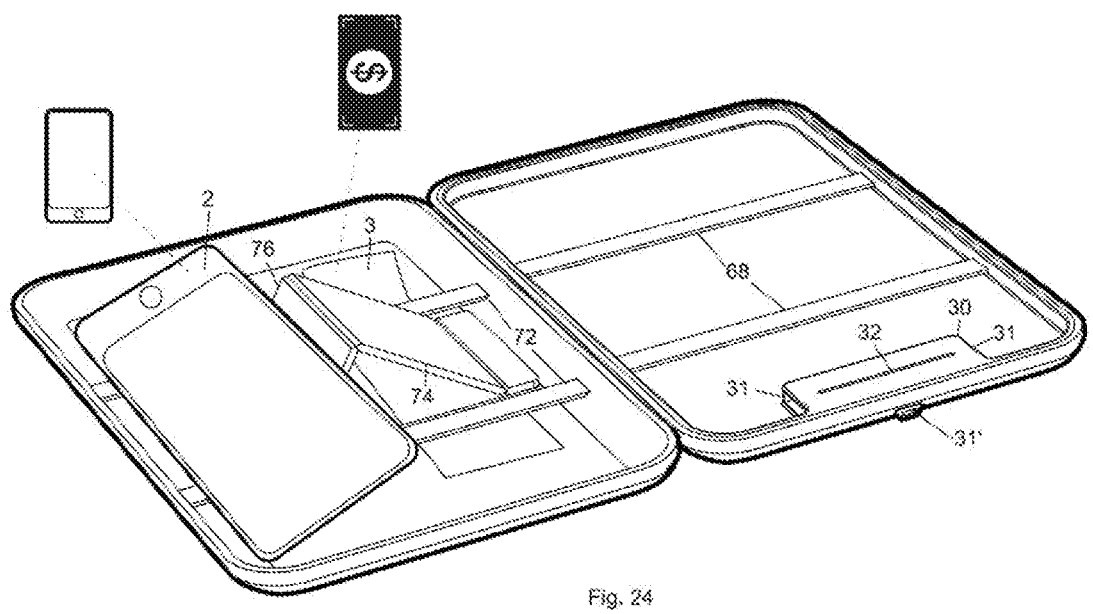
FIG. 24 is a perspective view of an opened portable power source device of FIG. 21 showing a support frame in a raised position and a mobile phone being supported by the support frame.
Figure 25:
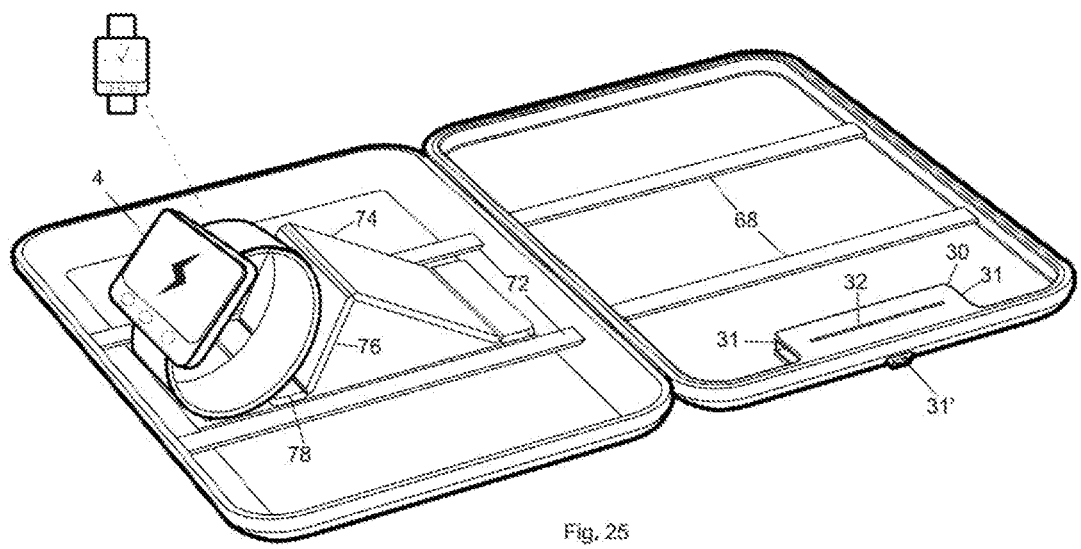
FIG. 25 is a perspective view of an opened portable power source device of FIG. 21 showing a support frame in a raised position and an intelligent wristwatch being supported by the support frame.

A support frame 70 may be provided on an inner surface of the lower shell 20. The support frame 70 may include two parallel and spaced apart guide rails 72, a first plate 74 having first and second ends, and a second plate 76 having first and second ends. The first ends of the first and second plates 74, 76 may be hingedly connected together. The second end of the first plate 74 may be fixedly mounted on one end of the two guide rails 72, and the second end of the second plate 76 may be hingedly connected to a third plate 78 which may be slidably connected with an opposite end of the two guide rails 72. The first, second and third plates 74, 76, 78 can be movable from a stowed position, as shown in FIG. 22, where the first, second and third plates 74, 76, 78 are lying flat between the two guide rails 72, and a raised position, as shown in FIG. 23, where the third plate 78 slides towards the first plate 74 along the two guide rails 72 until the first and second plates 74, 76 are disposed in slanted position with a slanted surface for supporting thereon an electronic device. FIG. 24 shows the support of a mobile phone 2 on the support frame 70. Banknote 3 may also be held underneath the two guide rails 72. FIG. 25 shows the support of an intelligent wristwatch 4 on the support frame 70.

The upper and lower shells 10, 20 of the case 1 of the embodiments may be made of plastic by injection molding, metal, leather, rubber, etc. The upper and lower shells 10, 20 may be made of any possible material and in any possible way, and is not limited to those mentioned above. The upper and lower shells 10, 20 may be formed of any kinds of ventilation holes for heat ventilation. The power source assembly 30 can be internally disposed, externally disposed or detachable, etc.

While the portable power source device has been shown and described with particular references to a number of preferred embodiments thereof, it should be noted that various other changes or modifications may be made without departing from the scope of the appended claims.

What is claimed is:

1. A portable power source device comprising:
 (a) a case comprising an upper shell and a lower shell;
 (b) a power source assembly embedded in a housing integrally formed with one of the upper and lower shells, the power source assembly comprising a battery, a control circuit board and at least one USB interface; and
 (c) a support frame mounted on an inner surface of the case and comprising a slanted portion for supporting thereon an electronic device;
 wherein the support frame comprises a longitudinal strip having a proximal end hingedly connected with one of the upper and lower shells and a distal end formed with a transversely extending portion, and the longitudinal strip is movable from a stowed position where the strip is lying flat in a recess formed on the inner surface of the one of the upper and lower shells, and a raised position where the longitudinal strip is flipped out to a position where the transversely extending portion is located above the inner surface.

2. The portable power source device as claimed in claim 1, wherein the upper and lower shells are hingedly connected together by a living hinge.

3. The portable power source device as claimed in claim 1, wherein the support frame is defined by an elongate trough formed on the inner surface of one of the upper and lower shells in which one side of the electronic device can be inserted for supporting the electronic device.

4. A portable power source device comprising:
 a case comprising an upper shell and a lower shell,
 a power source assembly embedded in a housing integrally formed with one of the upper and lower shells, the power source assembly comprising a battery, a control circuit board and at least one USB interface, and
 a support frame mounted on an inner surface of the case and comprising a slanted portion for supporting thereon an electronic device,
 wherein the support frame comprises a first plate fixedly connected on the inner surface of one of the upper and lower shells, a second plate having one side hingedly connected with the first plate, and a third plate hingedly connected with an opposite side of the second plate, whereby the first, second and third plates can be folded into a structure with a slanted surface to support thereon the electronic device.

5. A portable power source device comprising:
 a case comprising an upper shell and a lower shell,
 a power source assembly embedded in a housing integrally formed with one of the upper and lower shells, the power source assembly comprising a battery, a control circuit board and at least one USB interface, and
 a support frame mounted on an inner surface of the case and comprising a slanted portion for supporting thereon an electronic device,
 wherein the support frame comprises two parallel and spaced apart guide rails mounted on the inner surface of one of the upper and lower shells, a first plate having first and second ends, and a second plate having first and second ends, and wherein the first ends of the first and second plates are hingedly connected, the second end of the first plate is fixedly connected with one end of the two guide rails, and the second end of the second plate is hingedly connected with a third plate which is slidably connected with an opposite end of the two guide rails, whereby the first, second and third plates are movable from a stowed position where the first, second and third plates are lying flat between the two guide rails, and a raised position where the third plate slides towards the first plate along the two guide rails until the first and second plates are disposed in slanted position with a slanted surface for supporting thereon the electronic device.

6. The portable power source device as claimed in claim 1, further comprising a power-indicating unit being coupled with the power source assembly.

7. The portable power source device as claimed in claim 1, wherein at least one of the upper and lower shells is formed with a plurality of ventilation holes for heat ventilation.

8. The portable power source device as claimed in claim 1, further comprising a built-in USB charging cable connected with the power source assembly.

9. The portable power source device as claimed in claim 1, wherein the USB interface is a USB port provided on a housing of the power source assembly.

10. The portable power source device as claimed in claim 1, wherein a net pocket is provided on the inner surface of one of the upper and lower shells.

11. The portable power source device as claimed in claim 1, wherein a receptacle is formed on an outer surface of one of the upper and lower shells for receiving therein the battery.

12. The portable power source device as claimed in claim 1, wherein the upper and lower shells are fastened together by a fastener selected from the group consisting of magnetic fastener, press-fit fastener, friction-fit fastener, elastic belt, Velco™ fastener, snap button and zipper.

13. The portable power source device as claimed in claim 1, wherein the power source assembly is detachably mounted on the case.

14. The portable power source device as claimed in claim 1, wherein the upper shell is made of a flexible material.

* * * * *